No. 688,685. Patented Dec. 10, 1901.
S. D. POOLE.
DRAFT EQUALIZER.
(Application filed Sept. 27, 1901.)
(No Model.)
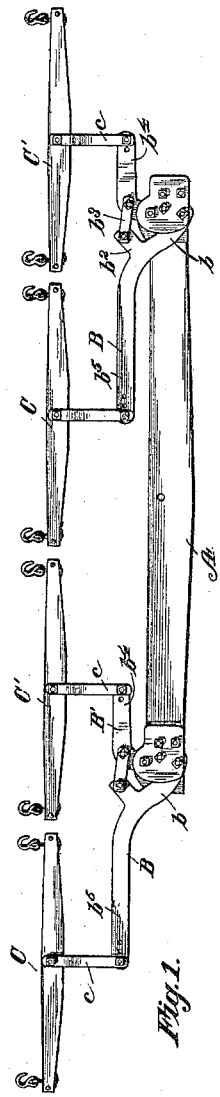
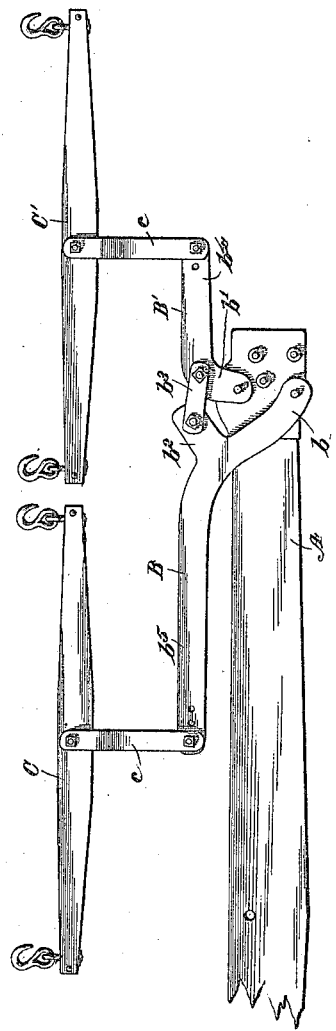
Witnesses
Inventor
Staley D. Poole
By His Attorney.

UNITED STATES PATENT OFFICE.

STALEY D. POOLE, OF MOLINE, ILLINOIS, ASSIGNOR TO DEERE & COMPANY, OF MOLINE, ILLINOIS, A CORPORATION OF ILLINOIS.

DRAFT-EQUALIZER.

SPECIFICATION forming part of Letters Patent No. 688,685, dated December 10, 1901.

Application filed September 27, 1901. Serial No. 76,789. (No model.)

*To all whom it may concern:*

Be it known that I, STALEY D. POOLE, a citizen of the United States, residing at Moline, in the county of Rock Island and State of Illinois, have invented certain new and useful Improvements in Draft-Equalizers; and I do hereby declare the following to be a full, clear, and exact description of the invention, such as will enable others skilled in the art to which it appertains to make and use the same.

This invention relates to draft-equalizers or eveners, and more particularly to eveners designed for dividing or apportioning the work of pulling gang-plows, mowing-machines, &c., among four horses abreast. In devices of this character as heretofore used it has been necessary in order to avoid "side draft" to provide a double hitch to the plow or other implement drawn, (which tends to thrust the implement out of its straight line of travel,) or else the team pulling the plow or other implement tends to draw sidewise from the proper line of draft or the direct line of travel of the machine. The location of four horses abreast in front of a two-furrow or gang plow leaves the plow not quite in the middle of the rear of the team, and in hitching to such plows a team of horses working four abreast it is particularly desirable to have the lead horse walk in the furrow and the other three horses on the unplowed ground without developing side draft or a diagonal pull on the traces.

The primary object of my invention is to provide means whereby a draft connection may be made between a team of four horses abreast and a gang-plow or other implement and to have the lead horse walk in the furrow and the other three horses on the unplowed ground and at the same time to equalize the draft or work of pulling the machine without a diagonal pull or side draft on the traces.

Other objects are to provide an evener or draft-equalizer of the character referred to which shall consist of few simple parts compactly arranged and which shall be strong, efficient, and durable in use and inexpensive in manufacture.

The invention will first be hereinafter more particularly described with reference to the accompanying drawings, which are to be taken as a part of this specification, and then pointed out in the claims at the end of the description.

In said drawings, Figure 1 represents a plan view of an evener or draft-equalizer embodying my invention designed for use with four horses abreast; and Fig. 2 is a plan view of one-half of the evener shown in Fig. 1, the top connecting-plate being removed to show the arrangement of the connections and pivots of the equalizing-levers.

In the drawings the draft-bar or doubletree of the evener is denoted by the letter A and is provided with a centrally-disposed aperture to receive the fastening-bolt of the clevis for connecting thereto a plow or other implement to be drawn. At each end of said draft-bar is pivotally secured the short arms $b\ b'$ of two unequal-armed angle-levers B B', respectively, to the longer arms of which are secured the connecting straps or links $c$ of the singletrees C C'. At a point about one-fourth the length of the lever B from the pivot of the short arm thereof a short arm or lug $b^2$ is provided, to which is pivoted one end of a connecting-link $b^3$, which has its other end pivoted to the lever B' at or about the junction of the longer with the shorter arm of the latter, and said lever B' has its shorter arm $b'$ pivoted to the draft-bar A, the pivot-bolts of the levers B and B' being arranged in substantially the same horizontal plane. The said levers B and B' are each preferably provided with a series of perforations at the ends of their longer arms, as shown, whereby the pivot-bolt of the strap or connecting-link, by which the singletree is secured to the said lever, may be shifted to change the leverage in case it is desired to increase or decrease the pull required of either draft-animal, and thus equalize differences in the make-up of the team.

In many eveners heretofore devised the attempt has been made by crowding the team together to minimize the effect of the side draft; but such crowding tends to heat and worry the team and is otherwise unsatisfactory. My invention overcomes these disadvantages and also provides a perfect evener in which every horse pulls his own load, counterbalancing the pull of his neighbor, while the pull of each pair of horses is perfectly counterbalanced by the pull of the opposite pair, assuming, of course, that all of the horses are pulling with an equal force and moving at a uniform speed. By the hereinbefore-described arrangement the right-hand or furrow horse is thrown considerably nearer the center clevis-hole of the doubletree or draft-bar A than is the corresponding outside horse on the left-hand side of the team. In other words, while the main draft-bar is centrally located as to the plow the team as a whole is arranged to the left of said center. Furthermore, the arrangement of leverages is such as not only to avoid side draft—each horse pulling straight and exactly parallel with the line of travel—but it has the additional advantage of giving great freedom to the team, the horses not being crowded together, but hitched considerably wider apart than is usual with other eveners heretofore in use.

Although the invention is especially designed and adapted for use as an evener or draft-equalizer for four horses abreast, it will be understood that the arrangement of levers and connections at one end of the draft-bar, which is an exact duplicate of the arrangement at the other end thereof, may be used alone for equalizing the draft between two horses abreast, if desired, and hence I do not desire to limit the application of the invention to a four-horse evener nor to any particular use, it being adapted to be used for other purposes and intended to be used in whatever relation or for whatever purpose it may be desired to use the same.

Having thus fully described my invention, what I claim as new, and desire to secure by Letters Patent of the United States, is—

1. An evener or draft-equalizer comprising a pair of unequal levers, each having the pivot of its shorter arm arranged in substantially the same horizontal plane extending in the line of draft, and a link pivotally connecting said levers at or about the junction of their longer with their shorter arms; said longer arms extending in opposite directions at an angle to a plane passing through said pivots, and having apertures therein for the attachment of a single or double tree, substantially as described.

2. An evener or draft-equalizer comprising a doubletree with provision for attaching the same at or about its center to the implement to be drawn, and a pair of unequal-armed levers at each side of said center having their shorter arms pivoted to said doubletree; said pivots being arranged in substantially the same horizontal plane extending in the line of draft, and the longer arms of the levers extending in opposite directions at an angle to the plane of said pivots, a link pivotally connecting the shorter arms of said levers at or about the junction with their longer arms, and means for connecting a single or double tree with the longer arm of each lever, substantially as described.

3. An evener or draft-equalizer, comprising a pair of unequal-armed levers having the pivots of their shorter arms arranged in substantially the same horizontal plane one in advance of the other, and their longer arms extending in opposite directions at an angle to a plane passing through said pivots, a link pivotally connecting said levers at intermediate points thereon, and draft devices attached to the longer arms of said levers, substantially as described.

4. An evener or draft-equalizer, consisting of a bent or curved lever, the longer arm of which is adapted for the attachment thereto of a single or double tree and its other arm to the pivot-bolt of the device to be drawn; a lug or projection on said lever located at a point about one-fourth the length of the lever from the end of the shorter arm thereof; an angle-lever having its shorter arm adapted to be pivoted adjacent to the pivot-bolt of the first-mentioned lever and its longer arm adapted for the attachment thereto of a single or double tree, and a link pivotally connecting said projection and angle-lever at the junction of the longer with the shorter arm of the latter, substantially as described.

5. In combination with the doubletree, a pair of unequal-armed levers at or near each end, each having its shorter arm pivoted at one end to said doubletree and its longer arm extending substantially parallel therewith, one of said pivots being arranged in advance of the other; and a link pivotally connecting said levers at or about the junction of the shorter with the longer arms thereof; the longer arms of said levers being adapted for the attachment thereto of a draft device, substantially as described.

6. A draft-equalizer or evener comprising a doubletree having a pair of unequal-armed levers with the shorter arms of each pair pivoted at or near each end thereof, the longer arms of said levers extending in opposite directions substantially parallel with the doubletree and adapted for the attachment thereto of a draft device, together with a link loosely connecting each pair of said levers at the junction of their longer with their shorter arms, substantially as described.

7. A draft-equalizer or evener comprising a doubletree having a pair of unequal-armed levers with the shorter arms of each pair pivoted at or near each end thereof, the longer arms of said levers extending in opposite directions substantially parallel with the doubletree and adapted for the attachment thereto of a draft device, together with a link loosely connecting each pair of said levers at the junction of their longer with their shorter arms, the longer lever at one end of the doubletree confronting the shorter lever at the other end thereof so that one outer draft-animal is brought considerably nearer the center of draft than the other, substantially as described.

8. In combination with the doubletree, a pair of unequal-armed levers arranged at each side of and equidistant from its center, having their shorter arms pivoted thereto and their longer arms extending in opposite directions substantially parallel therewith, and a link pivotally connecting each pair of levers intermediate their ends; the longer lever at one end projecting toward said center while the longer lever at the other end projects from said center, thereby locating the outer draft-animal at one side much nearer the center than the outer draft-animal at the other side, substantially as described.

9. An evener or draft-equalizer comprising a pair of unequal crooked levers having end pivots for their shorter arms arranged one in advance of the other, with their longer arms extending in opposite directions at an angle to their shorter arms, and having apertures in their free ends for the attachment of a single or double tree, and a link pivotally connecting the crooks or bends of the levers at the junction of the longer with the shorter arms thereof, substantially as described.

10. An evener or draft-equalizer comprising a doubletree with provision for attaching the same at or about its center to the implement to be drawn, and a pair of unequal-armed substantially bell-crank-shaped levers at each side of said center having the ends of their shorter arms pivoted to said doubletree, one in advance of the other, with the longer arms of the levers extending in opposite directions at an angle to the plane of the shorter arms, a link connecting the said levers at or about the junction of their longer with their shorter arms, and means for attaching a single or double tree to the free ends of the longer arms of the levers, substantially as described.

11. An evener or draft-equalizer comprising a pair of unequal crooked levers having end pivots for their shorter arms arranged one in advance of the other, and their longer arms extending in opposite directions from said pivots, and a link connecting said levers at or about the junction of their longer with their shorter arms and in substantially the same plane with said longer arms; the latter having perforations in their free ends for the attachment of a single or double tree, substantially as described.

12. An evener or draft-equalizer comprising a pair of unequal crooked levers having end pivots for their shorter arms arranged one in advance of the other, and their longer arms extending in opposite directions from said pivots, and a link connecting said levers at or about the junction of their longer with their shorter arms and in substantially the same plane with said longer arms; the latter having a series of perforations in their free ends for the attachment of a single or double tree, substantially as described.

In testimony whereof I affix my signature in presence of two witnesses.

STALEY D. POOLE.

Witnesses:
CHAS. H. POPE,
F. D. HOLT.